United States Patent
Zhong

(10) Patent No.: US 10,789,180 B2
(45) Date of Patent: Sep. 29, 2020

(54) SPI-BASED DATA TRANSMISSION METHOD AND DEVICE

(71) Applicant: Huawei Technologies Co., Ltd., Shenzhen (CN)

(72) Inventor: Shaohua Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/336,839

(22) PCT Filed: Jan. 16, 2017

(86) PCT No.: PCT/CN2017/071295
§ 371 (c)(1),
(2) Date: Mar. 26, 2019

(87) PCT Pub. No.: WO2018/058862
PCT Pub. Date: Apr. 5, 2018

(65) Prior Publication Data
US 2019/0391935 A1     Dec. 26, 2019

(30) Foreign Application Priority Data
Sep. 29, 2016 (CN) .......................... 2016 1 0868296

(51) Int. Cl.
*G06F 13/10* (2006.01)
(52) U.S. Cl.
CPC ...... *G06F 13/10* (2013.01); *G06F 2213/0002* (2013.01)
(58) Field of Classification Search
CPC ...................................................... G06F 13/10
(Continued)

(56) References Cited

U.S. PATENT DOCUMENTS 5,023,778 A * 6/1991 Simon, Jr. ............... G06F 15/17
703/27
8,135,881 B1 * 3/2012 Obkircher ........... G06F 13/4291
710/3
(Continued)

FOREIGN PATENT DOCUMENTS

CN    101552733 A    10/2009
CN    102231143 A    11/2011
(Continued)

OTHER PUBLICATIONS

SPI Interface Specification. VTI Technologies Sep. 19, 2005 (Year: 2005).*

(Continued)

*Primary Examiner* — Paul R. Myers
(74) *Attorney, Agent, or Firm* — Slater Matsil, LLP

(57) ABSTRACT

A serial peripheral interface (SPI)-based data transmission method, including sending, by a first device, a first query request to a second device through a universal asynchronous receiver/transmitter (UART) interface, where the first query request queries the second device for an SPI mode supported by the second device, sending, by the first device, in response to the first device determining, according to a first query response returned by the second device, that the second device supports an SPI master mode, an SPI connection establishment request to the second device, where the SPI connection establishment request causes the second device to initiate establishment of an SPI connection to the first device, and performing, by the first device, through the SPI, and after the first device establishes the SPI connection to the second device, at least one of receiving data sent by the second device, or sending data to the second device.

20 Claims, 5 Drawing Sheets

(58) Field of Classification Search
USPC .......................................................... 700/110
See application file for complete search history.

(56) References Cited

U.S. PATENT DOCUMENTS

| | | |
|---|---|---|
| 2004/0176857 A1 | 9/2004 | Tsunedomi et al. |
| 2008/0307126 A1 | 12/2008 | Chou |
| 2014/0143461 A1 | 5/2014 | Chettimada et al. |
| 2015/0378959 A1* | 12/2015 | Jones .................. G06F 13/4291 |
| | | 714/5.11 |
| 2018/0173671 A1* | 6/2018 | Fujiki ..................... H04L 12/40 |
| 2019/0253629 A1* | 8/2019 | Kim ................... H04N 5/23258 |

FOREIGN PATENT DOCUMENTS

| | | |
|---|---|---|
| CN | 102508812 B | 9/2013 |
| CN | 103460201 A | 12/2013 |
| CN | 103744825 A | 4/2014 |
| GB | 2488223 A | 8/2012 |

OTHER PUBLICATIONS

Dai, G. et al., "PsoCTM Architecture and Programming," China Science and Technology Press, 2005, 7 pages (with 2 pages translation).
Li, X., "AVR Microcontroller Principle and Application," Beijing Institute of Technology Press, 2020, 16 pages.

* cited by examiner

SPI-BASED DATA TRANSMISSION METHOD AND DEVICE

CROSS-REFERENCE TO RELATED APPLICATIONS

This application is a National Stage of International Application No. PCT/CN2017/071295, filed on Jan. 16, 2017, which claims priority to Chinese Patent Application No. 201610868296.8, filed on Sep. 29, 2016. Both of the aforementioned applications are hereby incorporated by reference in their entireties.

TECHNICAL FIELD

Embodiments of the present invention relate to the field of communications technologies, and in particular, to an SPI (serial peripheral interface)-based data transmission method and apparatus.

BACKGROUND

An Internet of Things device includes a host and a WWAN (wireless wide area network) module. The host is configured to implement service and data processing in an M2M (machine-to-machine) service, the WWAN module is configured to implement communication between an Internet of Things device and an Internet device by using a wireless network.

Currently, a USB (Universal Serial Bus) interface or a UART (universal asynchronous receiver/transmitter) interface is generally used between the host and the WWAN module for data transmission. Advantages and disadvantages of the USB interface and the UART interface are shown in Table 1.

TABLE 1

|  | Advantage | Disadvantage |
|---|---|---|
| USB interface | High transmission rate (approximately 480 Mbps) | High power consumption |
| UART interface | Low power consumption | Low transmission rate (approximately 3 Mbps) |

Some battery-powered Internet of Things devices have a high requirement for power consumption. If the device is a device that does not have a relatively high requirement for a transmission rate, for example, a device such as a smart water meter (which requires a battery that is not replaced for several years, but transmits a relatively small amount of data, and requires a relatively low transmission rate), the UART interface may be used.

However, for some battery-powered Internet of Things devices that have a relatively high requirement for the transmission rate, for example, for the device that needs to upgrade an MCU (micro control unit) in the host by using OTA (Over The Air), a relatively large amount of data needs to be transmitted during MCU firmware upgrade. In this case, if the data is transmitted through the UART interface having a relatively low transmission rate, it needs to take a relatively long time to complete an upgrade process, thereby increasing power consumption.

Power consumption of an SPI (serial peripheral interface) is relatively low, and a transmission rate of the SPI is greater than the transmission rate of the UART interface, and is approximately 24 Mbps. Therefore, the SPI is applicable to the foregoing Internet of Things device that has a relatively high requirement for both the power consumption and the transmission rate.

However, the WWAN module in the prior art generally supports an SPI master mode only, and does not support an SPI slave mode. To be specific, the WWAN module may actively initiate a communication process to the host by using the SPI, but the host cannot initiate a communication process to the WWAN by using the SPI, and this greatly restricts actual application.

SUMMARY

Embodiments of the present invention provide an SPI-based data transmission method, so that regardless of whether a WWAN module in an Internet of Things device supports an SPI master mode or an SPI slave mode, data transmission with a host in the Internet of Things device can be implemented by using an SPI.

According to a first aspect, an embodiment of the present invention provides an SPI-based data transmission method, including sending, by a first device, a first query request to a second device through a UART interface, where the first query request is used to query an SPI mode supported by the second device, receiving, by the first device, a first query response returned by the second device, if the first device determines, based on the first query response, that the second device supports an SPI master mode, sending, by the first device, an SPI connection establishment request to the second device, so that the second device initiates a process of establishing an SPI connection to the first device, and after the first device establishes the SPI connection to the second device, receiving, by the first device through the SPI, data sent by the second device, or sending data to the second device through the SPI.

By using the foregoing method, a problem that an SPI slave device cannot actively initiate an SPI communication process is avoided, so that the first device may request, by using the UART interface even if the first device serves as the SPI slave device, the second device as an SPI master device to initiate the SPI connection process. In addition, because data is transmitted through the SPI, power consumption is not significantly increased while a transmission rate is ensured.

With reference to the first aspect, in a first possible implementation of the first aspect, if the first device determines, based on the first query response, that the second device supports an SPI slave mode, the first device initiates a process of establishing an SPI connection to the second device. If the first device determines that the second device supports the SPI slave mode, the first device may serve as an SPI master device to communicate with the second device by using the SPI. Therefore, the first device serving as the SPI master device initiates an SPI connection process to the second device.

With reference to the first aspect, in a second possible implementation of the first aspect, before the first device sends the first query request to the second device through the UART interface, the first device may further send a second query request to the second device through the UART interface, where the request is used to query whether the second device stores data required by the first device, and if the second device stores the data required by the first device, the first device sends the first query request to the second device. If the second device does not include the data required by the first device, the process ends, and the first device does not need to send the first query request to the second device again, so as to improve system efficiency.

With reference to the first aspect, in a third possible implementation of the first aspect, before the first device sends the first query request to the second device through the UART interface, the first device may further send a dial-up instruction to the second device, and receive a response message that is returned by the second device and that indicates successful establishment of a session channel, so as to establish the session channel between the first device and the second device.

With reference to the first aspect, in a fourth possible implementation of the first aspect, after establishing the SPI connection to the second device, the first device may further send, through the SPI, a dial-up Internet access instruction to the second device, so that the second device performs dial-up Internet access.

With reference to the first aspect, in a fifth possible implementation of the first aspect, the first device is a host in the Internet of Things device, and the second device is a WWAN module in the Internet of Things device. According to the method provided in this embodiment of the present invention, a problem that the SPI slave device cannot actively initiate the SPI communication process is avoided, and data is transmitted through the SPI, so that power consumption is not significantly increased while a transmission rate is ensured. The method is applicable to communication between the host and the WWAN module in the Internet of Things device that have a relatively high requirement for the power consumption and the transmission rate.

With reference to the first aspect, in a sixth possible implementation of the first aspect, the host in the Internet of Things device may receive, through the SPI, MCU firmware data sent by the WWAN module. Because an amount of the MCU firmware data is relatively large, the SPI that ensures both transmission efficiency and the power consumption is appropriately used for transmission.

According to a second aspect, an embodiment of the present invention provides an SPI-based data transmission method, including receiving, by a second device through a UART interface, a first query request sent by a first device, where the first query request is used to query an SPI mode supported by the second device, sending, by the second device, a first query response to the first device, when the first query response is used to indicate that the second device supports an SPI master mode, receiving, by the second device, an SPI connection establishment request sent by the first device, initiating, by the second device, a process of establishing an SPI connection to the first device, and after the second device establishes the SPI connection to the first device, sending, by the second device, data to the first device through the SPI, or receiving, through the SPI, data sent by the first device.

With reference to the second aspect, in a first possible implementation of the second aspect, when the first query response is used to indicate that the second device supports an SPI slave mode, the second device responds to the SPI connection initiated by the first device.

With reference to the second aspect, in a second possible implementation of the second aspect, before the second device receives, through the UART interface, the first query request sent by the first device, the second device receives, through the UART interface, a second query request sent by the first device, where the second query request is used to query whether the second device stores data required by the first device, and the second device sends a second query response to the first query device, where the second query response is used to indicate that the second device stores the data required by the first device.

With reference to the second aspect, in a third possible implementation of the second aspect, before the second device receives, through the UART interface, the first query request sent by the first device, the second device receives a dial-up instruction sent by the first device, and the second device sends, to the first device, a response message indicating successful establishment of a session channel.

With reference to the second aspect, in a fourth possible implementation of the second aspect, after establishing the SPI connection to the first device, the second device may further receive a dial-up Internet access instruction sent by the first device through the SPI, and performs dial-up Internet access after receiving the instruction.

With reference to the second aspect, in a fifth possible implementation of the second aspect, the first device is a host in an Internet of Things device, and the second device is a wireless wide area network WWAN module in the Internet of Things device.

With reference to the second aspect, in a sixth possible implementation of the second aspect, the sending, by the second device, data to the first device through the SPI specifically includes sending, by the WWAN module, micro control unit MCU firmware data to the host of the Internet of Things device through the SPI.

According to a third aspect, an embodiment of the present invention provides a serial peripheral interface SPI-based data transmission device, where the device serves as a first device and includes a processor, and a memory and a transceiver that are separately connected to the processor.

The processor is configured to read a program in the memory, to execute the following process, including sending a first query request to a second device by using the transceiver through a universal asynchronous receiver/transmitter UART interface, where the first query request is used to query an SPI mode supported by the second device, and if it is determined, based on a first query response returned by the second device, that the second device supports an SPI master mode, sending, by using the transceiver, an SPI connection establishment request to the second device, so that the second device initiates a process of establishing an SPI connection to the first device, or after the SPI connection is established with the second device, receiving, by using the transceiver through the SPI, data sent by the second device or sending data to the second device through the SPI.

With reference to the third aspect, in a first possible implementation of the third aspect, the processor is further configured to if it is determined, based on the first query response, that the second device supports an SPI slave mode initiate the process of establishing the SPI connection to the second device.

With reference to the third aspect, in a second possible implementation of the third aspect, before sending the first query request to the second device by using the transceiver through the UART interface, the processor is further configured to send a second query request to the second device by using the transceiver through the UART interface, where the second query request is used to query whether the second device stores data required by the first device, and determine, based on a second query response returned by the second device, that the second device stores the data required by the first device.

With reference to the third aspect, in a third possible implementation of the third aspect, before sending the first query request to the second device by using the transceiver through the UART interface, the processor is further configured to send a dial-up instruction to the second device by using the transceiver, so that the first device establishes a session channel to the second device, and receive, by using the transceiver, a response message that is sent by the second device and that indicates successful establishment of the session channel.

With reference to the third aspect, in a fourth possible implementation of the third aspect, after the first device establishes the SPI connection to the second device, the processor is further configured to send a dial-up Internet access instruction to the second device by using the transceiver and the SPI, so that the second device performs dial-up Internet access.

With reference to the third aspect, in a fifth possible implementation of the third aspect, the first device is a host in an Internet of Things device, and the second device is a wireless wide area network WWAN module in the Internet of Things device.

With reference to the third aspect, in a sixth possible implementation of the third aspect, when receiving, by using the transceiver through the SPI, the data sent by the second device, the processor is specifically configured to receive, by using the transceiver through the SPI, micro control unit MCU firmware data sent by the WWAN module.

According to a fourth aspect, an embodiment of the present invention provides a serial peripheral interface SPI-based data transmission device, and the device includes a processor, and a memory and a transceiver that are separately connected to the processor.

The processor is configured to read a program in the memory, to execute the following process, including receiving, by using the transceiver through a universal asynchronous receiver/transmitter UART interface, a first query request sent by a first device, where the first query request is used to query an SPI mode supported by the second device, sending a first query response to the first device by using the transceiver, when the first query response is used to indicate that the second device supports an SPI master mode, receiving, by using the transceiver, an SPI connection establishment request sent by the first device, initiating a process of establishing an SPI connection to the first device, and after the SPI connection is established with the first device, sending data to the first device by using the transceiver through the SPI, or receiving, through the SPI, data sent by the first device.

With reference to the fourth aspect, in a first possible implementation of the fourth aspect, the processor is further configured to, when the first query response is used to indicate that the second device supports an SPI slave mode, respond to the SPI connection initiated by the first device.

With reference to the fourth aspect, in a second possible implementation of the fourth aspect, before receiving, by using the transceiver through the UART interface, the first query request sent by the first device, the processor is further configured to receive, by the processor by using the transceiver through the UART interface, a second query request sent by the first device, where the second query request is used to query whether the second device stores data required by the first device, and send, by the processor, a second query response to the first query device by using the transceiver, where the second query response is used to indicate that the second device stores the data required by the first device.

With reference to the fourth aspect, in a third possible implementation of the fourth aspect, before receiving, by using the transceiver through the UART interface, the first query request sent by the first device, the processor is further configured to receive, by using the transceiver, a dial-up instruction sent by the first device, and send, to the first device by using the transceiver, a response message indicating successful establishment of a session channel.

With reference to the fourth aspect, in a fourth possible implementation of the fourth aspect, after the second device establishes the SPI connection to the first device, the processor is further configured to receive, by using the transceiver, a dial-up Internet access instruction sent by the first device through the SPI, and perform dial-up Internet access.

With reference to the fourth aspect, in a fifth possible implementation of the fourth aspect, the first device is a host in an Internet of Things device, and the second device is a wireless wide area network WWAN module in the Internet of Things device.

With reference to the fourth aspect, in a sixth possible implementation of the fourth aspect, when sending the data to the first device by using the transceiver through the SPI, the processor is specifically configured to send micro control unit MCU firmware data to the host of the Internet of Things device by using the transceiver through the SPI.

According to a fifth aspect, an embodiment of the present invention provides a serial peripheral interface SPI-based data transmission system, including the first device according to any one of the third aspect and the possible implementations of the third aspect, and the second device according to any one of the fourth aspect and the possible implementations of the fourth aspect.

DETAILED DESCRIPTION OF ILLUSTRATIVE EMBODIMENTS

The following further describes in detail the embodiments of this application with reference to accompanying drawings.

An SPI bus system is a synchronous serial peripheral interface, which enables a microcontroller to communicate with various peripheral devices in a serial manner to exchange information.

Figure 1:
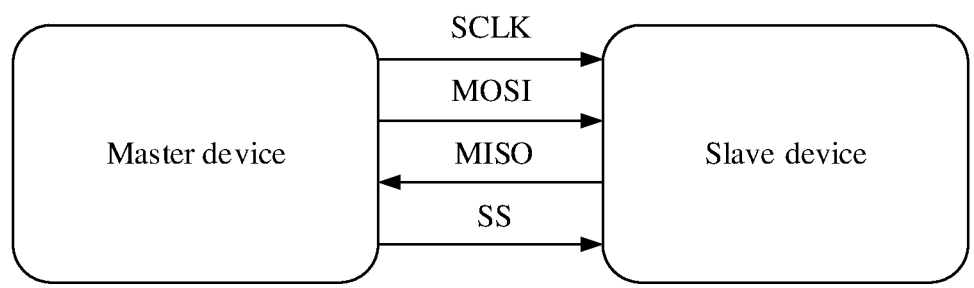
FIG. 1 is a schematic diagram of an SPI connection in the prior art.

As shown in FIG. 1, one of two devices that perform communication by using an SPI serves as a master device (Master), and the other serves as a slave device (Slave). The master device and the slave device are connected by using four pins.

MOSI: data output of the master device and data input of the slave device

MISO: data input of the master device and data output of the slave device

SCLK: clock signal Clock, which is generated by the master device

SS: slave device enable signal (chip select signal), which is controlled by the master device The master device sends the clock signal to the slave device, and the slave device cannot generate or control the clock signal. If the slave device does not receive the clock signal, the slave device cannot work normally. The pin SS is used to control whether a chip is selected. To be specific, the master device can perform communication by using the SPI only when the chip select signal is a prespecified enable signal. Therefore, the master device is connected to a plurality of slave devices by using a same bus.

Because the SPI is a high-speed, full-duplex, and synchronous communications bus, and occupies only four wires on a pin of a chip, a pin of the chip is reduced, space is saved for layout of a PCB (printed circuit board), power consumption is relatively low, and a transmission rate is relatively high. Due to these features, more chips use the SPI for communication. For example, the SPI may be applied to communication between a host of an Internet of Things device and a WWAN module, and is especially applicable to an Internet of Things device that has a relatively high requirement for both the power consumption and the transmission rate.

Generally, the host in the Internet of Things device may serve as either a master device or a slave device, and may be set based on a specific application scenario. However, the WWAN module in the Internet of Things device generally supports an SPI master mode only, that is, the WWAN module can only serve as a master device when performing communication by using the SPI. Therefore, when the host of the Internet of Things device communicates with the WWAN module by using the SPI, the WWAN module can only serve as the master device, and the host serves as the slave device, and this cannot be adjusted based on an actual application requirement. Consequently, the host serving as the slave device cannot actively initiate a communication process to the WWAN module by using the SPI, which is greatly restrictive.

Figure 2:
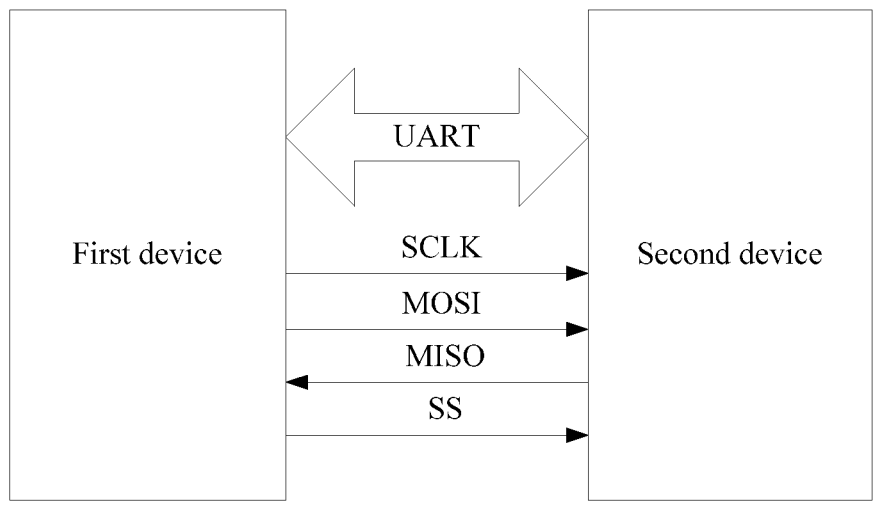
FIG. 2 is a schematic diagram of a device connection according to an embodiment of the present invention.
Figure 3:
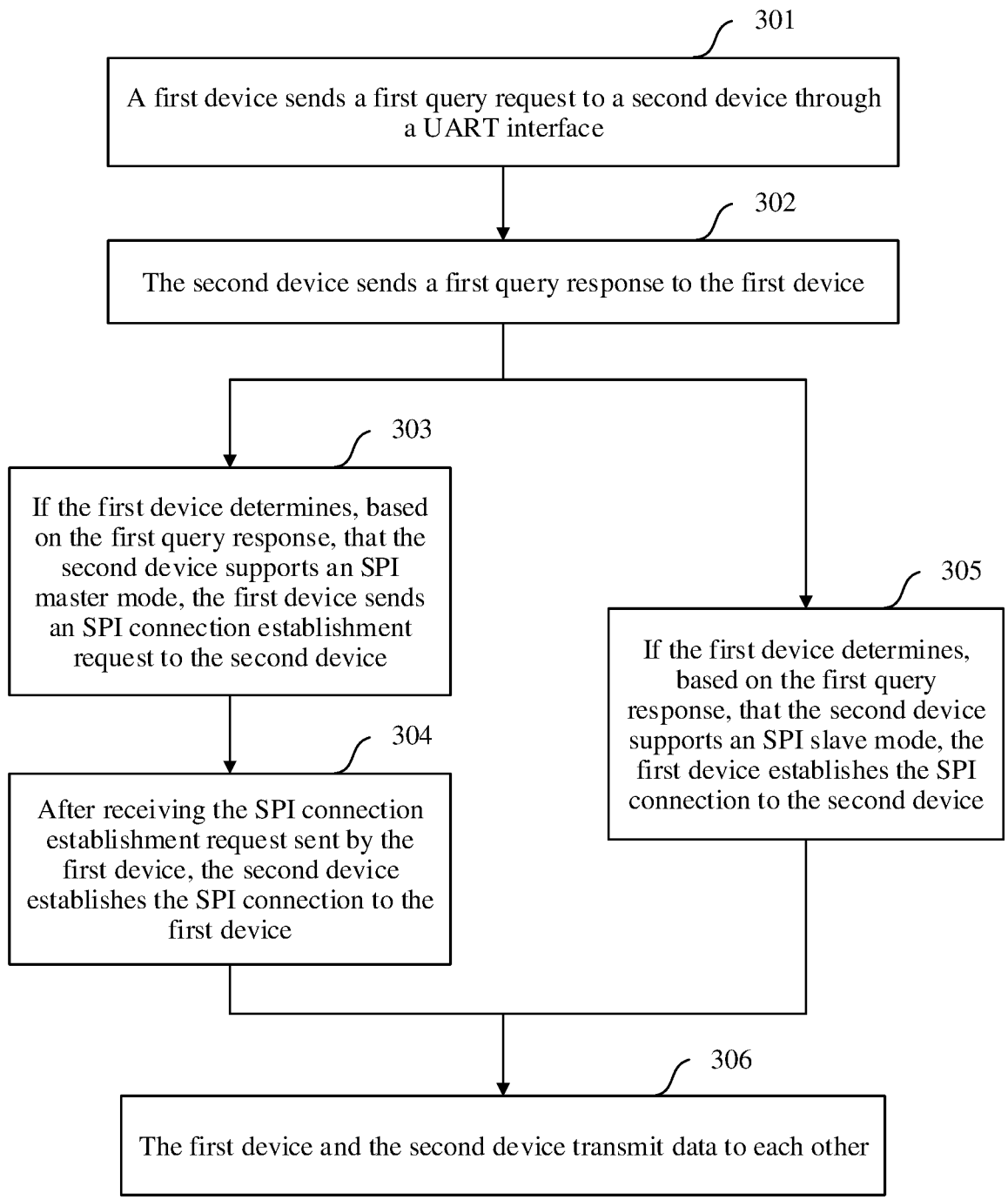
FIG. 3 is a schematic flowchart of an SPI-based data transmission method according to an embodiment of the present invention.

To resolve the foregoing problem, an embodiment of the present invention provides an SPI-based data transmission method, so that a slave device serving as the SPI may also actively initiate a communication process. The method may be applied to a communication process between a first device and a second device shown in FIG. 2. For a procedure in which the first device and the second device perform data transmission by using the method provided in this embodiment of the present invention, refer to FIG. 3. As shown in the figure, the method includes the following steps.

Step 301: The first device sends a first query request to the second device through a UART interface.

The first query request is used to query an SPI mode supported by the second device.

Step 302: The second device sends a first query response to the first device.

The first query response sent by the second device through the UART interface includes the SPI mode supported by the second device. If the second device supports an SPI master mode, the process proceeds to step 303, if the second device does not support an SPI master mode, the process proceeds to step 305.

Step 303: If the first device determines, based on the first query response, that the second device supports the SPI master mode, the first device sends an SPI connection establishment request to the second device.

If the second device supports the SPI master mode, to be specific, the second device performs SPI communication as a master device, the first device can only serve as a slave device when performing SPI communication with the second device. As described above, the slave device needs to receive an SPI clock signal Clock sent by the master device to work normally. Therefore, the first device may send the SPI connection establishment request to the second device through the UART interface, so that the second device sends the SPI clock signal Clock to the first device after receiving the request.

If the first device actively initiates the communication process to obtain the required data from the second device, optionally, when sending the SPI connection establishment request to the second device, the first device may further notify the second device of the data required by the first device, so that after the first device establishes an SPI connection to the second device, the second device can immediately transmit the data required by the first device to the first device. Certainly, after establishing the SPI connection, the first device may also send a data transmission request to the second device, so that the second device knows the data required by the first device and sends the data to the first device by using an MOSI pin after establishing the SPI connection to the first device.

Step 304: After receiving the SPI connection establishment request sent by the first device, the second device establishes the SPI connection to the first device.

Specifically, the second device sends the clock signal Clock to the first device by using an SCLK pin. After receiving the clock signal Clock, the first device returns a response message to the second device by using an MISO pin. In other words, the SPI connection between the first device and the second device has been successfully established, and subsequent data transmission may be performed.

If the first device actively initiates the communication process to obtain the required data from the second device, and does not notify the second device of the data required by the first device in step 303, the first device may further notify the second device of the required data after step 304.

Step 305: If the first device determines, based on the first query response, that the second device supports an SPI slave mode, the first device establishes the SPI connection to the second device.

If the second device supports the SPI slave mode, the second device performs SPI communication as a slave device, and therefore, the first device can serve as a master device to control the second device to perform SPI communication.

Specifically, the first device sends the clock signal Clock to the second device by using the SCLK pin. After receiving the clock signal Clock, the second device returns the response message to the first device by using the MISO pin. In other words, the SPI connection between the first device and the second device has been successfully established, and subsequent data transmission may be performed.

Step 306: The first device and the second device transmit data to each other.

Because the SPI supports full duplex, that is, bidirectional signal transmission may be simultaneously performed, the first device and the second device may simultaneously transmit data to each other, and the first device may send data to the second device, or the second device may send data to the first device.

If the first device has notified the second device of the data required by the first device, the second device may directly transmit, by using the MOSI pin, the data required by the first device to the first device. For example, the first device needs to obtain MCU firmware of a later version from the second device, and may notify the WWAN in step 303 or after step 304. The second device sends a stored MCU firmware program of a later version to the first device by using the MOSI pin, so that an MCU in the first device completes firmware upgrade.

In some embodiments, if the first device actively initiates the communication process to obtain data from the second device, before sending the first query request to the second device through the UART interface, the first device may further send a second query request to the second device through the UART interface, so as to query whether the second device stores the data required by the first device. If the second device stores the data required by the first device, the first device sends the first query request to the second device again to perform the foregoing procedure. If there is no data required by the first device in the second device, the procedure ends.

Before the first device establishes the SPI connection to the second device, the first device first communicates with the second device by using the UART interface, and queries whether the second device includes the data required by the first device. If the second device does not include the data required by the first device, step 301 to step 306 do not need to be performed. This prevents the first device from finding that the second device does not include the data required by the first device after performing the foregoing steps, thereby improving system efficiency.

In some embodiments, before step 301, the first device may further send a dial-up instruction to the second device through the UART interface, so that a session channel is established between the first device and the second device. Certainly, if a session channel establishment state may also be always maintained between the first device and the second device, the first device does not need to send the dial-up instruction again. Specifically, the dial-up instruction may be an AT instruction. AT is short for attention, and the AT instruction is generally applied to connection and communication between a terminal device and a host. The AT instruction begins with a character "AT", includes a response data packet in the middle, and ends with a preset string. A corresponding return is provided for each instruction regardless of whether the instruction is successfully executed. Therefore, after receiving the AT dial-up instruction, the second device returns a dial-up success message to the first device through the UART interface. This indicates that the session channel between the first device and the second device has been established.

In some other embodiments, after the first device establishes the SPI connection to the second device, the first device may further send a dial-up Internet access instruction to the second device, and the second device performs dial-up Internet access after receiving the instruction. The first device may not be connected to a network, but the second device can be connected to the network. In this case, after the first device establishes the SPI connection to the second device, the first device may instruct the second device to perform dial-up Internet access by using the SPI, and obtain, from the network side, the data required by the first device.

In the foregoing embodiment, the first device in the Internet of Things device communicates with the second device by using the UART interface with relatively low power consumption, queries the SPI mode supported by the second device, and establishes the SPI connection to the second device based on the SPI mode supported by the second device, so as to transmit a large amount of data through the SPI. This does not significantly increase the power consumption while ensuring the transmission rate, and resolves a problem that the SPI slave device cannot actively initiate an SPI communication process, and therefore is well applicable to the Internet of Things device that has a relatively high requirement for both the power consumption and the transmission rate.

To better understand the SPI-based data transmission method provided in this embodiment of the present invention, an example in which the first device is the host in the Internet of Things device, and the second device is the WWAN module in the Internet of Things device is used for description below.

Embodiment 1

Figure 4:
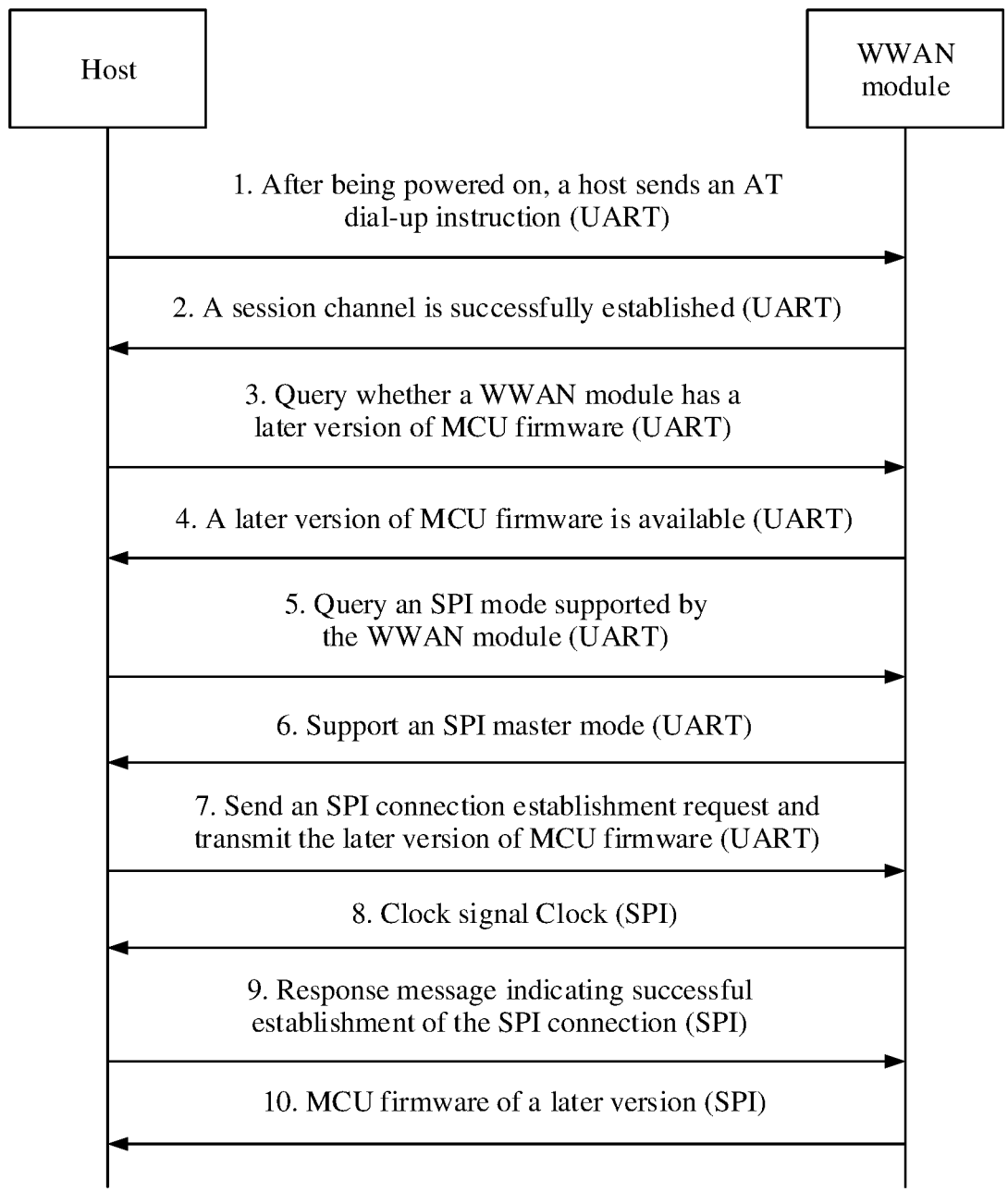
FIG. 4 is a schematic diagram of a specific application scenario according to an embodiment of the present invention.

FIG. 4 is a schematic flowchart of obtaining to-be-upgraded MCU firmware from a WWAN module after a host in an Internet of Things device is powered on periodically. As shown in the figure, the method includes the following.

Step 1: The host sends an AT dial-up instruction to the WWAN module through a UART interface after the host is powered on.

Step 2: The WWAN module returns, to the host through the UART interface, a response message indicating successful establishment of a session channel.

Step 3: The host queries, by using the UART interface, whether the WWAN module stores MCU firmware data of a later version.

Step 4: The WWAN module replies to, through the UART interface, the host that the WWAN module stores the MCU firmware data of the later version.

Step 5: The host queries, by using the UART interface, an SPI mode supported by the WWAN module. A query instruction may be an AT instruction.

Step 6: The WWAN module replies to, through the UART interface, the host that the WWAN module supports an SPI slave mode.

Step 7: The host sends, to the WWAN module through the UART interface, an SPI connection establishment request and a request for transmitting the MCU firmware data of the later version.

Step 8: The WWAN module sends a clock signal Clock to the host by using an SCLK pin.

Step 9: The host returns, to the WWAN module by using an MISO pin, a response message indicating successful establishment of an SPI connection.

Step 10: The WWAN module sends the MCU firmware data of the later version to the host by using an MOSI pin.

Embodiment 2

Figure 5:
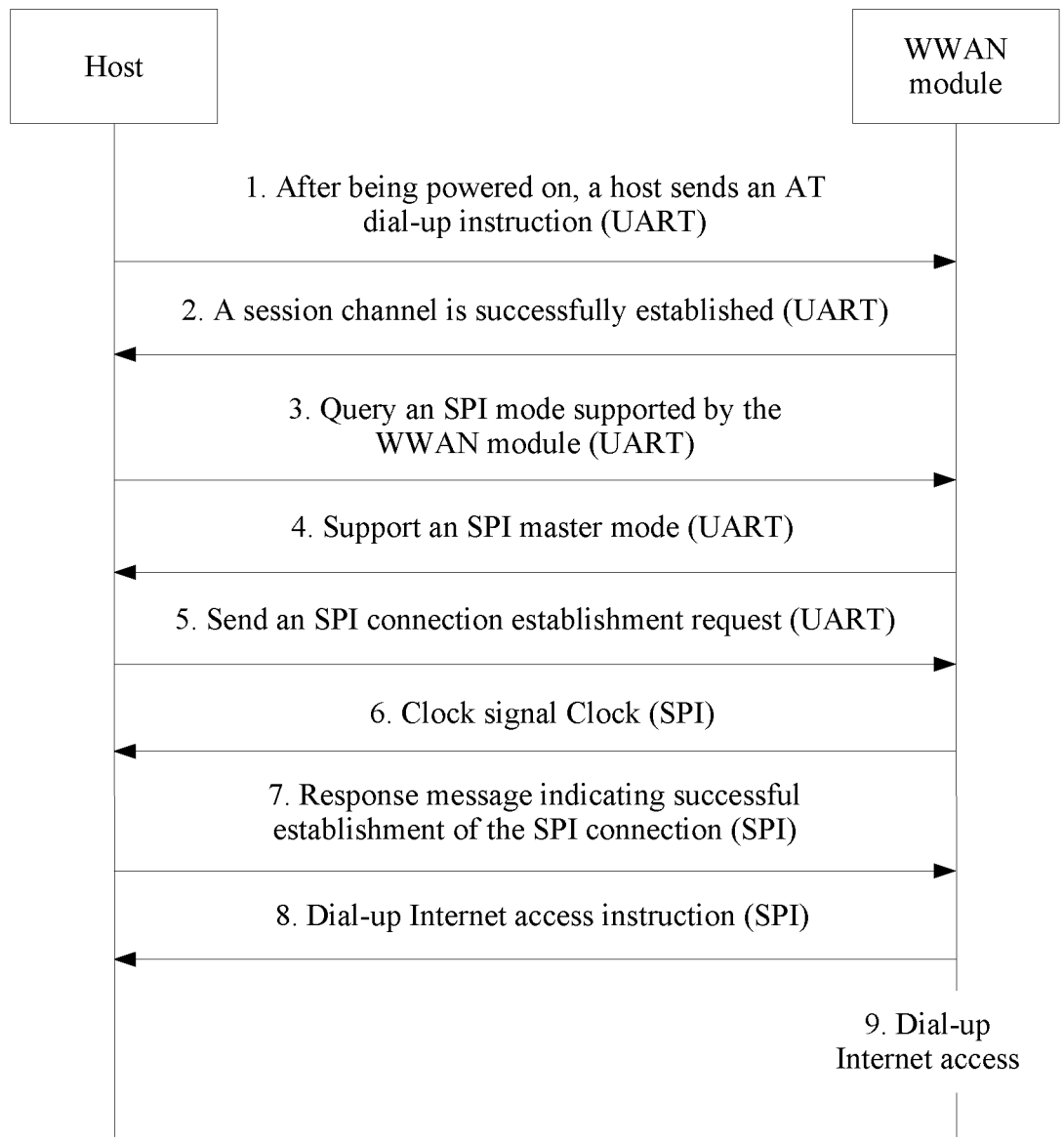
FIG. 5 is a schematic diagram of another specific application scenario according to an embodiment of the present invention.

FIG. 5 is a schematic flowchart of instructing a WWAN module to perform dial-up Internet access after a host in an Internet of Things device is powered on periodically. As shown in the figure, the method includes the following.

Step 1 and step 2 are consistent with step 1 and step 2 in Embodiment 1.

Step 3: The host queries, by using the UART interface, an SPI mode supported by the WWAN module. A query instruction may be an AT instruction.

Step 4: The WWAN module replies to, through the UART interface, the host that the WWAN module supports an SPI slave mode.

Step 5: The host sends an SPI connection establishment request to the WWAN module through the UART interface.

Step 6: The WWAN module sends a clock signal Clock to the host by using an SCLK pin.

Step 7: The host returns, to the WWAN module by using an MISO pin, a response message indicating successful establishment of an SPI connection.

Step 8: The host sends a dial-up Internet access instruction to the WWAN module by using the MISO pin.

Step 9: The WWAN module performs dial-up Internet access.

Figure 6:
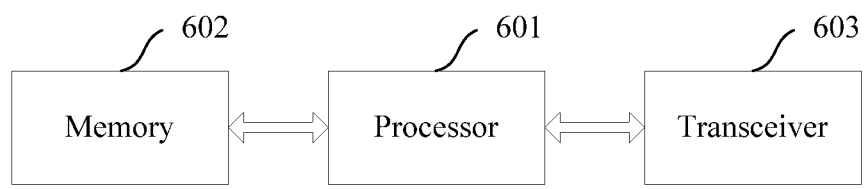
FIG. 6 is a schematic structural diagram of a first device according to an embodiment of the present invention.

Based on a same technical concept, an embodiment of the present invention further provides a serial peripheral interface SPI-based data transmission device. The device serves as a first device to implement the foregoing method embodiment. A schematic structural diagram of the device is shown in FIG. 6, and the device includes a processor 601, and a memory 602 and a transceiver 603 that are separately connected to the processor 601.

The processor 601 is configured to read a program in the memory 602, to execute the following process, including sending a first query request to a second device by using the transceiver 603 through a universal asynchronous receiver/transmitter UART interface, where the first query request is used to query an SPI mode supported by the second device, and if it is determined, based on a first query response returned by the second device, that the second device supports an SPI master mode, sending, by using the transceiver 603, an SPI connection establishment request to the second device, so that the second device initiates a process of establishing an SPI connection to the first device, or after the SPI connection is established with the second device, receiving, by using the transceiver 603 through the SPI, data sent by the second device or sending data to the second device through the SPI.

Optionally, the processor 601 is further configured to, if it is determined, based on the first query response, that the second device supports an SPI slave mode, initiate the process of establishing the SPI connection to the second device.

Optionally, before sending the first query request to the second device by using the transceiver 603 through the UART interface, the processor 601 is further configured to, send a second query request to the second device by using the transceiver 603 through the UART interface, where the second query request is used to query whether the second device stores data required by the first device, and determine, based on a second query response returned by the second device, that the second device stores the data required by the first device.

Optionally, before sending the first query request to the second device by using the transceiver 603 through the UART interface, the processor 601 is further configured to send a dial-up instruction to the second device by using the transceiver 603, so that the first device establishes a session channel to the second device, and receive, by using the transceiver 603, a response message that is sent by the second device and that indicates successful establishment of the session channel.

Optionally, after the first device establishes the SPI connection to the second device, the processor 601 is further configured to send a dial-up Internet access instruction to the second device by using the transceiver 603 through the SPI, so that the second device performs dial-up Internet access.

Optionally, the first device is a host in an Internet of Things device, and the second device is a wireless wide area network WWAN module in the Internet of Things device.

Optionally, when receiving, by using the transceiver 603 through the SPI, the data sent by the second device, the processor 601 is specifically configured to receive, by using the transceiver 603 through the SPI, micro control unit MCU firmware data sent by the WWAN module.

Figure 7:
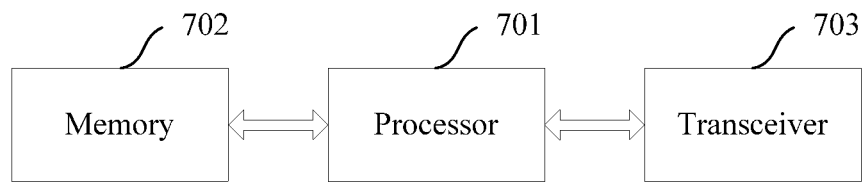
FIG. 7 is a schematic structural diagram of a second device according to an embodiment of the present invention.

Based on a same technical concept, an embodiment of the present invention further provides a serial peripheral interface SPI-based data transmission device. The device serves as a second device to implement the foregoing method embodiment. A schematic structural diagram of the device is shown in FIG. 7, and the device includes a processor 701, and a memory 702 and a transceiver 703 that are separately connected to the processor 701.

The processor 701 is configured to read a program in the memory 702, to execute the following process, including receiving, by using the transceiver 703 through a universal asynchronous receiver/transmitter UART interface, a first query request sent by a first device, where the first query request is used to query an SPI mode supported by the second device, sending a first query response to the first device by using the transceiver 703, when the first query response is used to indicate that the second device supports an SPI master mode, receiving, by using the transceiver 703, an SPI connection establishment request sent by the first device, initiating a process of establishing an SPI connection to the first device, and after the SPI connection is established with the first device, sending data to the first device by using the transceiver 703 through the SPI, or receiving, through the SPI, data sent by the first device.

Optionally, the processor 701 is further configured to, when the first query response is used to indicate that the second device supports an SPI slave mode, respond to the SPI connection initiated by the first device.

Optionally, before receiving, by using the transceiver 703 through the UART interface, the first query request sent by the first device, the processor 701 is further configured to receive, by the processor 701 by using the transceiver 703 through the UART interface, a second query request sent by the first device, where the second query request is used to query whether the second device stores data required by the first device, and send, by the processor 701, a second query response to the first query device by using the transceiver 703, where the second query response is used to indicate that the second device stores the data required by the first device.

Optionally, before receiving, by using the transceiver 703 through the UART interface, the first query request sent by the first device, the processor 701 is further configured to receive, by using the transceiver 703, a dial-up instruction sent by the first device, and send, to the first device by using the transceiver 703, a response message indicating successful establishment of a session channel.

Optionally, after the first device establishes the SPI connection to the second device, the processor 701 is further configured to receive, by using the transceiver 703, a dial-up Internet access instruction sent by the first device through the SPI, and perform dial-up Internet access.

Optionally, the first device is a host in an Internet of Things device, and the second device is a wireless wide area network WWAN module in the Internet of Things device.

Optionally, when sending the data to the first device by using the transceiver 703 through the SPI, the processor 701 is specifically configured to send, by using the transceiver 703 through the SPI, micro control unit MCU firmware data to the host in the Internet of Things device.

Based on a same technical concept, an embodiment of the present invention further provides an SPI-based data transmission system, where the system includes the first device in any one of the foregoing embodiments and the second device in any one of the foregoing embodiments. For example, an Internet of Things device may include a system provided in this embodiment of the present invention. A host in the Internet of Things device is the first device in the foregoing system, and a WWAN module in the Internet of Things device is the second device in the foregoing system, so that the host and the WWAN module may perform data transmission based on the SPI, and are not limited by an SPI master/slave mode.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A serial peripheral interface (SPI)-based data transmission method, comprising:
    sending, by a first device, a first query request to a second device through a universal asynchronous receiver/transmitter (UART) interface, wherein the first query request queries the second device for an SPI mode supported by the second device;
    sending, by the first device, in response to the first device determining, according to a first query response returned by the second device, that the second device supports an SPI master mode, an SPI connection establishment request to the second device, wherein the SPI connection establishment request causes the second device to initiate establishment of an SPI connection to the first device; and
    performing, by the first device, through the SPI, and after the first device establishes the SPI connection to the second device, at least one of receiving data sent by the second device, or sending data to the second device.

2. The method according to claim 1, further comprising:
    initiating, by the first device, establishment of an SPI connection to the second device in response to the first device determining, according the first query response, that the second device supports an SPI slave mode.

3. The method according to claim 1, further comprising performing, before the sending the first query request to the second device:
    sending, by the first device, a second query request to the second device through the UART interface, wherein the second query request queries the second device regarding whether the second device stores data required by the first device; and
    determining, by the first device according to a second query response returned by the second device, that the second device stores the data required by the first device.

4. The method according to claim 1, further comprising performing, before the sending the first query request to the second device:
    sending, by the first device, a dial-up instruction to the second device, the dial-up instruction causing the first device to establish a session channel to the second device; and
    receiving, by the first device, a response message that is sent by the second device and that indicates successful establishment of the session channel.

5. The method according to claim 1, wherein the first device is a host in an Internet of Things device, and wherein the second device is a wireless wide area network (WWAN) module in the Internet of Things device.

6. The method according to claim 5, wherein the receiving the data sent by the second device comprises:
    receiving, by the host of the Internet of Things device through the SPI, micro control unit MCU firmware data sent by the WWAN module.

7. The method according to claim 1, further comprising:
    notifying, by the first device, the second device of data required by the first device; and
    receiving, by the first device, data sent by the second device in response to the first device notifying the second device of the data required by the first device.

8. A device, comprising:
    a transceiver;
    a processor; and
    a non-transitory computer-readable storage medium storing a program to be executed by the processor, the program including instructions for:
        sending a first query request to a second device through the transceiver through using a universal asynchronous receiver/transmitter (UART) interface, wherein the first query request queries the second device for a serial peripheral interface (SPI) mode supported by the second device;

causing the transceiver to send, in response to determining, according a first query response returned by the second device, that the second device supports an SPI master mode, an SPI connection establishment request to the second device, wherein the SPI connection establishment request causes the second device to initiate establishment of an SPI connection to the device; and performing, through the transceiver and using an SPI, after the SPI connection is established with the second device, at least one of receiving data sent by the second device, or sending data to the second device.

9. The device according to claim 8, wherein the program further includes instructions for:

initiating establishment of an SPI connection to the second device in response to the device determining, according the first query response, that the second device supports an SPI slave mode.

10. The device according to claim 8, wherein the program further includes instructions for performing, before the sending the first query request to the second device:

causing the transceiver to send a second query request to the second device the UART interface, wherein the second query request queries the second device regarding whether the second device stores data required by the device; and determining, according to a second query response returned by the second device, that the second device stores the data required by the device.

11. The device according to claim 8, wherein the program further includes instructions for performing, before the sending the first query request to the second device:

causing the transceiver to send a dial-up instruction to the second device by using the transceiver, so that the device establishes a session channel to the second device; and receive, through the transceiver, a response message that is sent by the second device and that indicates successful establishment of the session channel.

12. The device according to claim 8, wherein the device is a host in an Internet of Things device, and wherein the second device is a wireless wide area network (WWAN) module in the Internet of Things device.

13. The device according to claim 12, the instructions for receiving data sent by the second device, include instructions for:

receiving, through the transceiver and through the SPI, micro control unit (MCU) firmware data sent by the WWAN module.

14. The device according to claim 8, wherein the program further includes instructions for:

notifying the second device of data required by the device; and receiving data sent by the second device in response to the device notifying the second device of the data required by the device.

15. A device, comprising:
a transceiver;
a processor; and
a non-transitory computer-readable storage medium storing a program to be executed by the processor, the program including instructions for:

receiving, through the transceiver using a universal asynchronous receiver/transmitter (UART) interface, a first query request sent by another device, wherein the first query request queries the device for an SPI mode supported by the device;

causing the transceiver to send a first query response to the another device;

receiving, through the transceiver, in response to the first query response indicating that the device supports an SPI master mode, an SPI connection establishment request sent by the another device;

initiating a process of establishing an SPI connection to the another device; and performing, through the transceiver and using the SPI, after the SPI connection is established with the another device, at least one of sending data to the another device, or receiving data sent by the another device.

16. The device according to claim 15, wherein the program further includes instructions for:

responding to an SPI connection initiated by the another device in response to the first query response indicating that the device supports an SPI slave mode.

17. The device according to claim 15, wherein the program further includes instructions for performing, before the receiving the first query request sent:

receiving, through the transceiver using the UART interface, a second query request sent by the another device, wherein the second query request queries the device regarding whether the device stores data required by the another device; and cause the transceiver to send a second query response to the another device, wherein the second query response indicates that the device stores the data required by the another device.

18. The device according to claim 15, wherein program further includes instructions for performing, before the receiving the first query request:

receiving, through the transceiver, a dial-up instruction sent by the another device; and causing the transceiver to send, to the another device, a response message indicating successful establishment of a session channel.

19. The device according to claim 15, wherein the another device is a host in an Internet of Things device, and wherein the device is a wireless wide area network (WWAN) module in the Internet of Things device.

20. The device according to claim 19, wherein instructions for sending the data to the another device include instructions for:

causing the transceiver to send micro control unit (MCU) firmware data to the host of the Internet of Things device using the SPI.

* * * * *